March 14, 1961 J. H. BENT ET AL 2,974,609
BEAM MOUNTED TRACTOR
Filed Sept. 22, 1958 3 Sheets-Sheet 1

JOHN H. BENT
RICHARD H. OLSSON
INVENTORS

BY Peter J. Murphy
ATTORNEY

March 14, 1961    J. H. BENT ET AL    2,974,609
BEAM MOUNTED TRACTOR
Filed Sept. 22, 1958    3 Sheets-Sheet 2
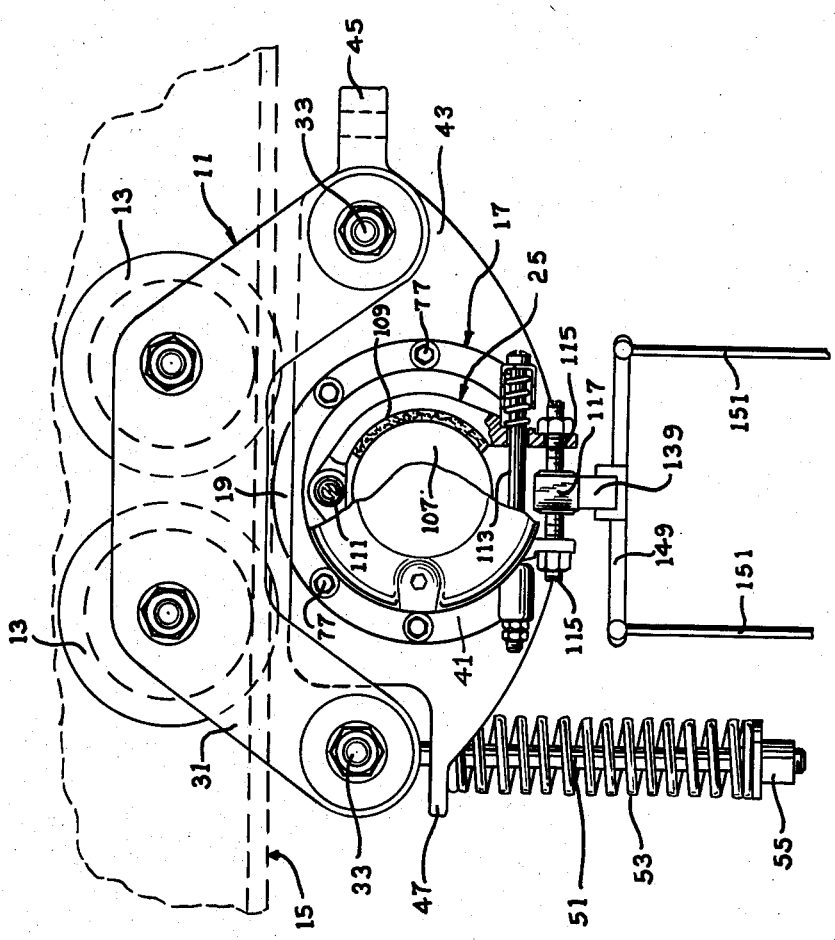
JOHN H. BENT
RICHARD H. OLSSON
INVENTORS
BY *Peter J. Murphy*
ATTORNEY

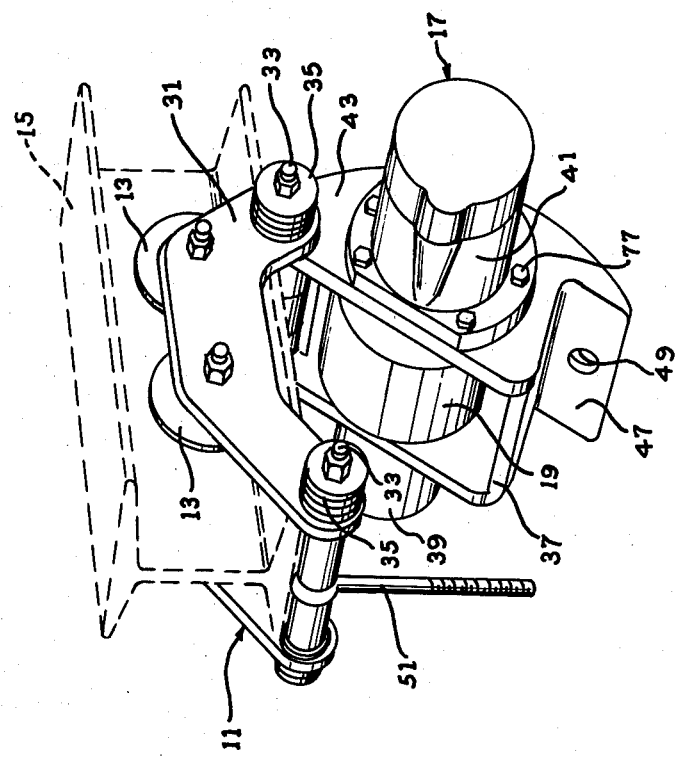

United States Patent Office 2,974,609
Patented Mar. 14, 1961

2,974,609

BEAM MOUNTED TRACTOR

John H. Bent, Fullerton, and Richard H. Olsson, La Puente, Calif., assignors to Gardner-Denver Company, a corporation of Delaware Filed Sept. 22, 1958, Ser. No. 762,368

3 Claims. (Cl. 105—153)

This invention relates to a tractor adapted to travel along an overhead beam, and more particularly to a beam mounted tractor for moving hoists or other trolley supported equipment.

An object of this invention is to provide a powerful, lightweight tractor of the type described which is of simple, rugged, and compact design.

Another object of this invention is to provide a beam mounted tractor which is readily adjustable to beams of different size and in which the load on the traction wheel is adjustable.

A further object of this invention is to provide a beam mounted tractor having a housing in which a motor, drive shaft, brake mechanism, gear reduction mechanism, and traction wheel are coaxially arranged to provide for compactness and simplicity of structure.

A still further object of this invention is to provide a tractor wherein a beam engaging traction wheel is mounted in the center of a housing and the driving mechanism is arranged in the housing on either side of the traction wheel to provide a unit which is balanced on the beam.

A still further object of this invention is to provide a beam mounted tractor having a brake which is operated automatically and simultaneously with the tractor motor.

A still further object of this invention is to provide a beam mounted tractor of a design to provide ease of assembly and disassembly and replacement of the traction wheel.

A tractor, which accomplishes the foregoing objects, comprises a trolley frame carrying flanged wheels adapted to ride on the upper faces of a beam flange. The tractor drive mechanism is enclosed in a compact, elongated housing having a traction wheel mounted within the center portion thereof and which is connected to the trolley frame at its center portion. A drive motor and its control means are disposed in one end of the housing and a reduction mechanism and a brake mechanism are disposed in the other end of the housing. The reduction mechanism and the brake mechanism are operatively connected to a motor driven shaft which passes through the traction wheel. A control shaft assembly connects the motor control means and the brake mechanism so that these are operated simultaneously.

The novel features of the invention, as well as additional objects and advantages thereof, will be understood more fully from the following description when read in connection with the accompanying drawing in which:

Figure 2 is a side view of the tractor including an end view of the tractor housing partially broken away to show the brake mechanism; and Figure 3 is a perspective view of the tractor showing the housing pivoted away from its operative position with respect to the trolley.

Figure 1:
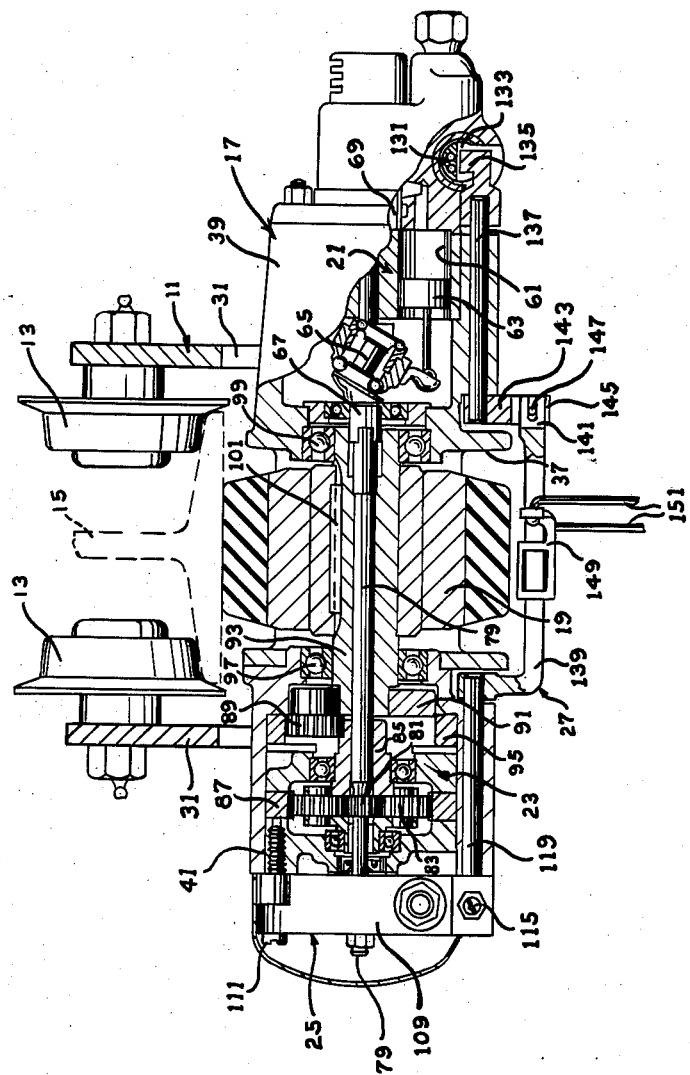
Figure 1 is an end view of a tractor, showing a side view of the tractor housing partially in section.

Referring now in detail to the accompanying drawings, the tractor includes a trolley 11 including flanged wheels 13 which ride on the upper faces of an I-beam 15, for example. The tractor drive mechanism is enclosed in an elongated housing 17 which is pivotally mounted, at one side, to one end of the trolley 11 and which is resiliently secured, at the other side, to the other end of the trolley. A traction wheel 19 is rotatably mounted within the center portion of the housing. A motor 21, shown as an air operated piston motor, and its associated control valve mechanism are mounted in one end of the housing 17. A reduction mechanism 23 and brake mechanism 25 are mounted in the other end of the housing 17. The control valve mechanism and the brake mechanism are operated simultaneously by means of a control shaft assembly 27 which extends from one end of the housing to the other.

The trolley 11 is comprised of two generally C-shaped side plates 31 which are secured together at the ends thereof, by means of spacer bolts 33. The spacer bolts determine the minimum distance between the side plates and this distance may be increased by using washers 35 to adjust the trolley for I-beams of different dimensions. A pair of flanged wheels 13 are rotatably mounted on each of the side plates 31 intermediate the ends thereof to ride on the I-beam flange.

The housing 17 is elongated and includes a center or wheel housing 37, an end or motor housing 39, and an end or gear housing 41. The wheel housing 37 defines a box partially enclosing the traction wheel 19 and includes a bifurcated extension 43 at one side having a bore for receiving one of the spacer bolts 33, by means of which the housing 17 is pivotally secured to the trolley 11. A draw bar tongue 45, by means of which the tractor is coupled to a hoist, for example, is carried by the spacer bolt within the bifurcated extension 43. The wheel housing 37 has an extension at its other side including a flange 47 having a hole 49. A bolt 51 is pivotally mounted on the other spacer bolt 33, at the end of the trolley opposite from the draw bar tongue. The hole 49 is disposed to receive the bolt 51. A compression spring 53, placed over the bolt 51 and secured thereon by a nut 55, resiliently secures the housing 17 to the trolley 11 at the end opposite from the pivotal connection.

The wheel housing 37 is open at the top so that the traction wheel 19 mounted therein, in a manner to be described, extends beyond the upper portion of the housing to engage the under surface of the I-beam. The traction wheel is preferably provided with a tire or rim of resilient material which is resistant to oil, grease, and abrasion. The force with which the wheel is urged against the beam 15 is controlled by the spring 53 and nut 55. The wheel housing 37 is also open at the bottom to eliminate a wheel well which may accumulate grease and dirt to either contaminate the wheel rim or reduce the traction of the wheel.

The motor housing 39 encloses an air, or other pressure fluid, operated motor 21 of the type comprising circumferentially arranged cylinders 61 having pistons 63 acting through a wobble plate transmission 65 to impart rotary motion to a shaft 67 journaled at opposite ends of a motor housing. The motor 21 is reversible and air is supplied thereto under control of a rotary distributing valve mechanism 69 driven by the motor. A control valve mechanism for operating the motor and the rotary distributing valve mechanism will be referred to subsequently.

The gear housing 41 is detachably secured to the wheel housing 37 by means of bolts 77 and encloses the reduction mechanism 23. A drive shaft 79 extends through the gear housing and through the wheel housing to engage the motor shaft 67 in driving relationship. The drive shaft 79 extends from the outer end of the gear housing for cooperation with the brake mechanism 25 to be described. The drive shaft 79 is provided with a geared portion 81 which meshes with planetary gears 83 carried in a cage 85. The planetary gears 83 also mesh with a ring gear 87 fixed to the gear housing 41. The cage 85 is provided with a geared portion which meshes with planetary gears 89 carried by cage 91 which is keyed to a driven shaft 93. The planetary gears 89 mesh with a ring gear 95 also fixed to the gear housing 41. The driven shaft 93 is rotatably supported in bearing 97, mounted in the gear housing 41, and in bearing 99, mounted in the wheel housing 37. The traction wheel 19 is fixed to the driven shaft 93 by means of a key 101. Hence the traction wheel is driven by the motor through a double planetary gear reduction mechanism.

The gear housing 41 is readily removable from the wheel housing 37 by removing the bolts 77. When the gear housing is removed, the drive shaft 79 disengages from the motor shaft 67 and the driven shaft 93 is withdrawn from the bearing 99. The driven shaft 93 then pulls out of the traction wheel 19 to facilitate removal and replacement. Since the wheel housing is open at the bottom, the removal and replacement of the traction wheel may be accomplished without demounting the tractor from the I-beam.

A brake wheel or drum 107 is fixed to the end of the drive shaft 79 extending from the outer end of the gear housing 41. A pair of brake shoes 109, having suitable linings, are pivotally mounted to the gear housing 41, by means of a pivot stud 111, and are disposed for engagement with the brake drum. The shoes are biased toward the drum by a spring and bolt assembly 113. Each shoe is provided with an adjustment screw 115 at its end opposite from the pivot point. These screws are disposed to engage an actuator cam 117 which is rectangular in shape and which is secured to one end of a shaft 119 rotatably mounted in the gear housing 41.

The motor 21 is controlled by a valve mechanism which includes a shiftable member 131. The particular valve mechanism forms no part of the present invention and will not be described further except to state that, when the member is shifted in one direction, the motor is driven in one direction and when the member is shifted in the other direction, the motor is driven in a reverse direction. Reference may be had to U.S. Patent No. 2,445,585, issued July 20, 1948 to E. H. Shaff, which describes a rotary distributing valve mechanism and a control valve mechanism suitable for use with the motor of the present tractor. The shiftable member 131 is shown in Figure 1 and corresponds to the valve member 43 of the above mentioned patent. The shiftable member 131 is movable rectilinearly and is provided with a groove 133 adapted to receive a crank arm 135 which is fixed to one end of a shaft 137 rotatably mounted in the motor housing 39.

The shaft 119 and the shaft 137 are aligned axially and both extend out of their respective housings at points adjacent to the wheel housing 37. An L-shaped arm 139 is fixed to the end of the shaft 119 adjacent to the wheel housing and defines an extension of the shaft 119 which is displaced from the shaft axis and which extends to the motor housing. The arm 139 is provided with a bifurcated end 141 remote from the shaft 119. A radial arm 143 is fixed to the end of the shaft 137 adjacent to the wheel housing and is provided with a bifurcated end 145 having a pin 147. The bifurcated end 141 is received within the bifurcated end 145 and receives the pin 147. In this manner the shafts 119 and 137 are coupled through arms 139 and 143 to define the control shaft assembly 27. This assembly 27 is rotatable as a unit; therefore, the brake actuator cam 117 is rotated when the shiftable member 131 is shifted.

In order to control the tractor, an operating lever 149, from which may be suspended a pair of cords 151, may be fixed to the arm 139. When one or other of the cords is pulled, the control shaft assembly 27 will be rocked or rotated about its axis to control the tractor. This control system is similar to that described in the above mentioned Patent No. 2,445,585, wherein the control shaft 22 is equivalent to the above described control shaft assembly 27. It will be observed that this control shaft assembly is separable so that the gear housing 41 may be readily removed to replace the traction wheel 19 as described heretofore.

Reference may be had to U.S. Patent No. 2,743,708, issued May 1, 1956 to J. C. Lungerhausen, which describes a further refinement of the valve mechanism described in Patent No. 2,445,585 and further describes a remote pendent control which may be used to control the tractor of the present invention in lieu of the cord control described above.

In operation, the control shaft assembly 27 is held in a neutral position by the springs 113 of the brake mechanism. The springs bias the brake shoes 109 toward the brake drum 107 and toward each other so that the brake is engaged and the shoes act on the actuator cam 117. The crank arm 135 and the shiftable member 131 are held in a neutral position wherein the motor is not actuated.

When the control shaft assembly is rotated in one direction by the operating lever 149, the motor is driven in one direction to drive the tractor along the beam in one direction. Simultaneously, the actuator cam spreads the brake shoes to release the brake. When the operating lever is released, the control shaft assembly is returned to its neutral position to stop the motor and to permit the brake to engage. The brake is engaged at all times when the motor is not positively actuated.

When the tractor is operated by a remote pendent control as described in Patent 2,743,708, the shiftable member 131 is shifted by the pendent control mechanism and this rotates the control shaft assembly and operates the brake.

There has been described a tractor for mounting on a beam which has a number of features not found in tractors of this type presently available. The drive mechanism of the above described tractor is disposed in a coaxial arrangement to provide a compact structure. With this arrangement, a minimum number of parts are used resulting in reduced weight and bulk of the tractor. The housing and mechanism of the tractor are readily dismantled to facilitate replacement of the traction wheel and for general overhaul. The housing is resiliently secured to supporting trolley so that the loading on the traction wheel may be controlled. The traction wheel is mounted in the center portion of the housing, directly beneath the trolley, and the drive mechanism is disposed in the housing on either side of the traction wheel so that the tractor is balanced with respect to the beam. The trolley portion of the tractor is readily adjustable to accommodate beams of different size. The tractor is provided with a brake which is engaged at all times when the motor is not positively actuated and which is disengaged when the motor is actuated. The tractor is operated by an air motor which is safe to operate in an explosive atmosphere.

We claim:
1. A tractor adapted for movement along a beam comprising: a housing having a center portion and two end portions; a reversible motor, including a shaft, mounted in one of said housing end portions; a drive shaft and a hollow driven shaft coaxially and rotatably mounted in the other housing end portion; planetary reduction gear means connecting said drive shaft and said driven shaft; said drive shaft and said driven shaft traversing said housing center portion; and said drive shaft being detachably coupled to said motor shaft; a traction wheel nonrotatably mounted on said driven shaft within said housing center portion; a trolley comprising a pair of frame members secured together in spaced relationship;

flanged wheels rotatably mounted on said frame members for engaging the upper faces of a beam flange; means for adjusting the spaced relationship of said frame members to accommodate said trolley to beams of different width; said housing being pivotally attached to one end of said trolley; adjustable resilient means for detachably securing said housing to the other end of said trolley to engage said traction wheel with the lower face of a beam and control the load on said traction wheel; said other housing end portion being detachably secured to said housing center portion; and said adjustable resilient means being detachable and said other housing end portion, with said drive shaft and said driven shaft, being detachable to facilitate the replacement of said traction wheel.

2. A tractor adapted for movement along a beam comprising: an elongated housing consisting of a central wheel housing, a motor housing at one end, and a gear housing at the other end detachably secured to said wheel housing; said wheel housing having top and bottom openings; a frame pivotally mounted, at one end, to one side of said wheel housing; a plurality of flanged wheels mounted on said frame for engagement with the upper faces of a beam flange; a traction wheel carried in said wheel housing and extending through said top opening for engagement with the lower face of the beam; the bottom opening of said wheel housing permitting passage of said traction wheel; means for resiliently securing the other end of said frame to the other side of said wheel housing to provide pressure engagement of said flanged wheels and said traction wheel with the beam; a reversible motor mounted in said motor housing; planetary gear reduction means, mounted in said gear housing, including and operatively connecting inner and outer coaxial shafts which extend through said wheel housing; said inner shaft being drivingly and detachably coupled to said motor and said outer shaft supporting said traction wheel in driving relationship whereby said traction wheel is driven by said motor through said gear reduction means; and said gear housing, with said gear reduction means and said coaxial shafts, being readily detachable from said wheel housing and said traction wheel to permit said traction wheel to be removed from said wheel housing through one of said openings.

3. A tractor adapted for movement along a beam comprising: an elongated housing consisting of a central wheel housing, a motor housing at one end, and a gear housing at the other end detachably secured to said wheel housing; said wheel housing having top and bottom openings; a frame pivotally mounted, at one end, to one side of said wheel housing; a plurality of flanged wheels mounted on said frame for engagement with the upper faces of a beam flange; a traction wheel carried in said wheel housing and extending through said top opening for engagement with the lower face of the beam; the bottom opening of said housing permitting passage of said traction wheel; means for resiliently securing the other end of said frame to the other side of said wheel housing to provide pressure engagement of said flanged wheels and said traction wheel with said beam; a reversible motor mounted in said motor housing; a control member for actuating said motor; planetary gear reduction means, mounted in said gear housing, including and operatively connecting inner and outer coaxial shafts which extend through said wheel housing; said inner shaft being drivingly and detachably coupled to said motor and said outer shaft supporting said traction wheel in driving relationship whereby said traction wheel is driven by said motor through said reduction gear means; a first control shaft, mounted in said motor housing, for actuating said motor control member; a brake mechanism mounted in said gear housing for braking said inner shaft; a second control shaft, mounted in said gear housing, for actuating said brake mechanism; said second control shaft traversing said wheel housing and being operatively and detachably coupled to said first control shaft; said control shafts being operable to control simultaneously said motor and said brake mechanism; and said gear housing, with said gear reduction means, said coaxial shafts and said second control shaft, being readily detachable from said wheel housing, said traction wheel and said first control shaft to permit said traction wheel to be removed from said wheel housing through said bottom opening.

References Cited in the file of this patent
UNITED STATES PATENTS

| | | |
|---|---|---|
| 839,024 | Nelson | Dec. 18, 1906 |
| 2,154,702 | Saborsky | Apr. 18, 1939 |
| 2,168,986 | Harris | Aug. 8, 1939 |
| 2,228,034 | Nelles | Jan. 7, 1941 |
| 2,655,871 | Mazzola | Oct. 20, 1953 |